W. H. HERMSDORF.
RETREADING APPARATUS.
APPLICATION FILED FEB. 5, 1919.

1,318,383.

Patented Oct. 14, 1919.
2 SHEETS—SHEET 1.

Witness:
S. Mann

Inventor,
Walter H. Hermsdorf
By Frank L. Belknap

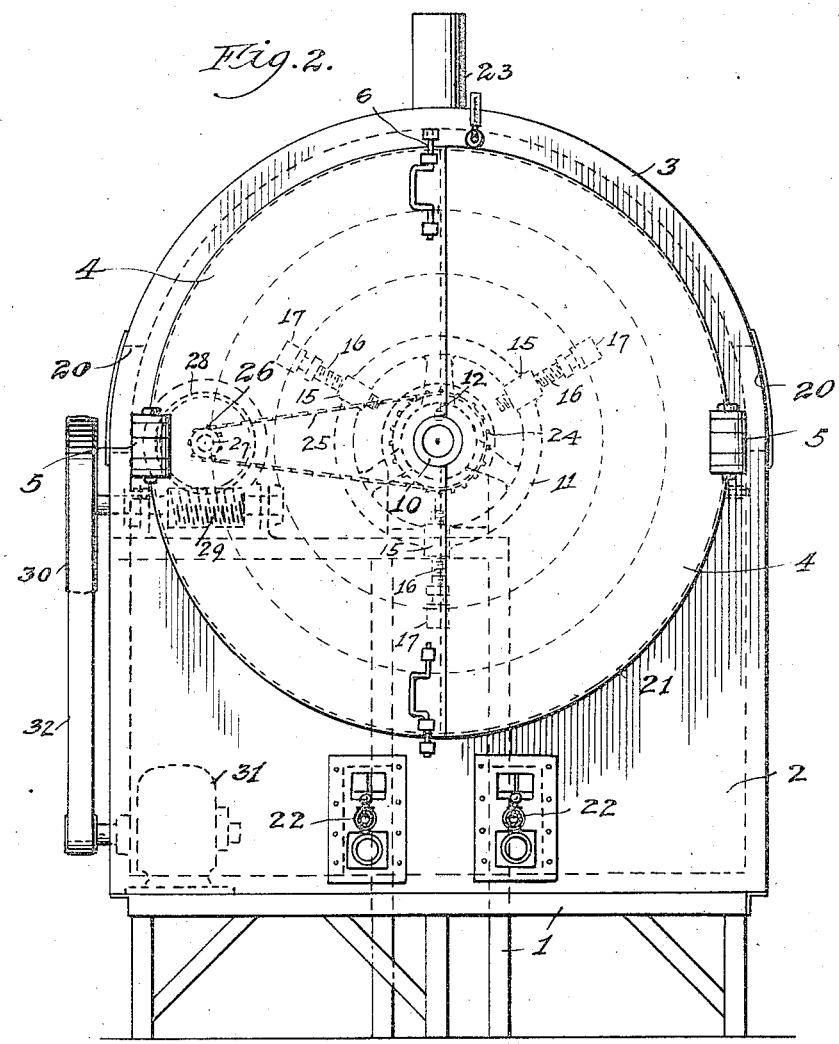
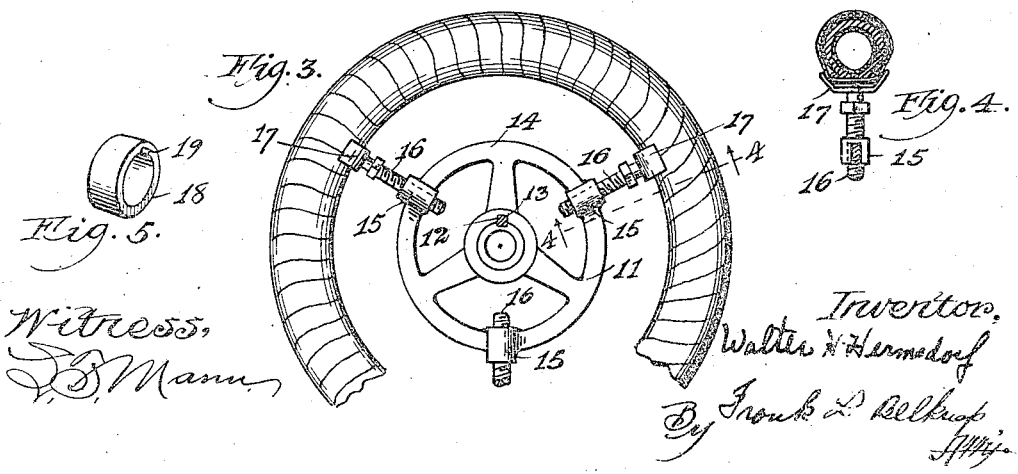

UNITED STATES PATENT OFFICE.

WALTER H. HERMSDORF, OF CHICAGO, ILLINOIS, ASSIGNOR TO SOLOMON H. GOLDBERG, OF CHICAGO, ILLINOIS.

RETREADING APPARATUS.

1,318,383.  Specification of Letters Patent.  Patented Oct. 14, 1919.

Application filed February 5, 1919. Serial No. 275,173.

*To all whom it may concern:*

Be it known that I, WALTER H. HERMSDORF, a citizen of the United States, residing in the city of Chicago, county of Cook, and State of Illinois, have invented certain new and useful Improvements in Retreading Apparatus, of which the following is a specification.

This invention relates to improvements in retreading apparatus and refers more particularly to an apparatus adapted for carrying out the process described in the pending application #265,829. Inasmuch as a description of the process is fully set forth in said co-pending application, it is not thought necessary that any detail description of this need be inserted here. The object of the invention is to provide an improved form of vulcanizing oven in which a plurality of tires may have new treads vulcanized to the old tire body in accordance with said process. Before the tire with its new tread is placed in the oven, the old tire is cleaned and then the new tread, by means of certain solutions, secured around the tire body. The inner tube or bag is inserted in the tire body and inflated to a desired pressure. It is also understood that the tire is wound with suitable fabric and is then ready to be inserted in the oven.

In the drawings:

Fig. 2 is a similar front elevation.

Fig. 3 is a fragmentary view showing the manner of mounting the tire in the oven.

Fig. 4 is a sectional view on line 4—4 of Fig. 3.

Fig. 5 is a perspective view of a spacing collar used in the assembling of the tires.

Figure 1:
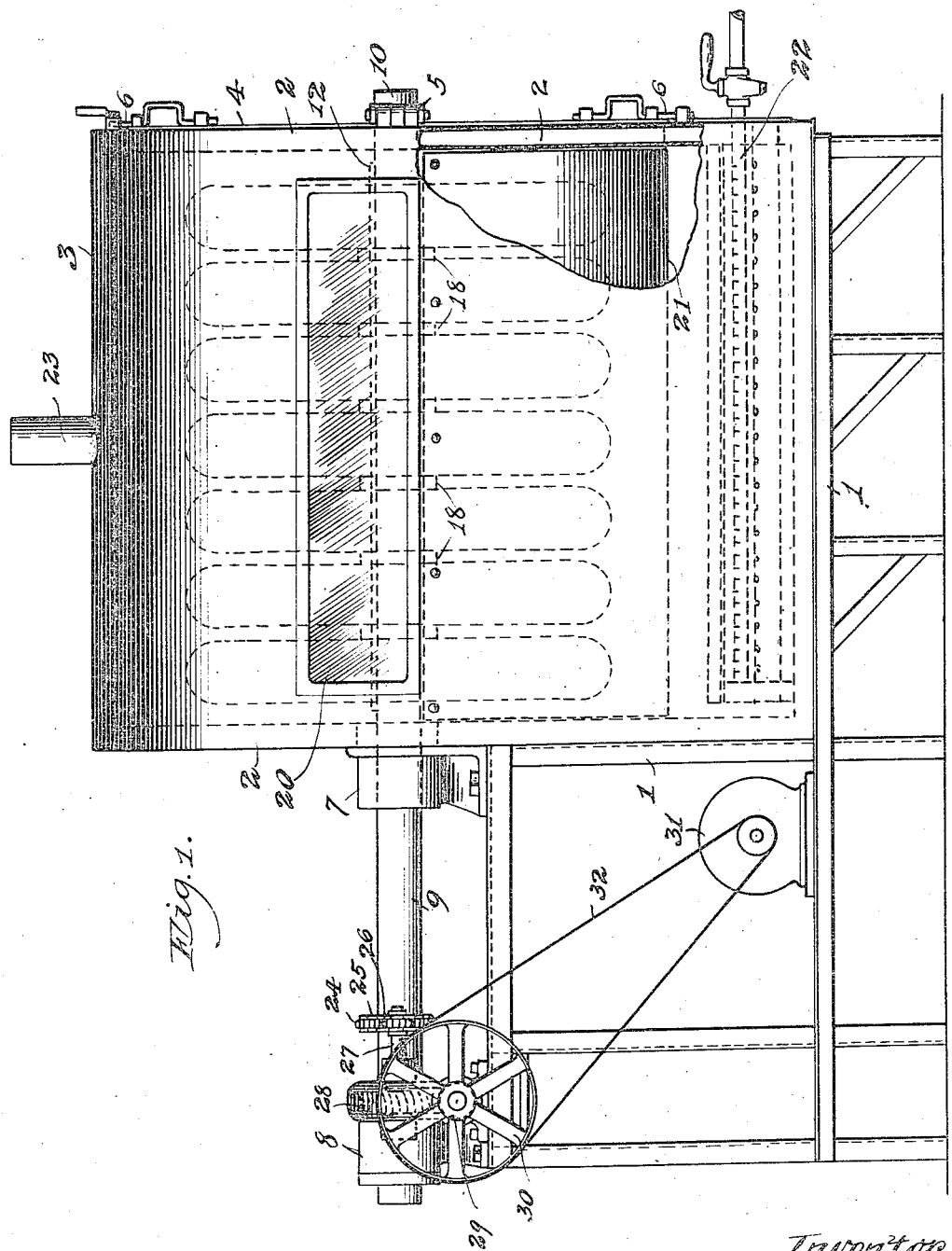
Figure 1 is a side elevation with parts shown in dotted lines.

Referring to the drawings, 1 designates a frame work on which is supported an oven 2 having a semi-cylindrical top 3 and provided at one end with doors 4 hinged as shown at 5 to the oven. The doors are locked by means of plunger bolts 6. In suitable bearing members 7 and 8 is mounted a hollow tubular shaft 9 which extends through the bearings and through the oven and projects out the front end of the oven at 10. On the shaft 9 are mounted a plurality of supporting spiders 11 which are keyed to rotate with the shaft. To this end, a key rod 12 extends through the oven and is fixed to the shaft. The spiders are provided with keyways 13 so that they can slide on the shaft. The outer periphery 14 of each spider is provided with bosses 15 threaded to receive a stem or stud 16 the outer end of each carrying a saddle member 17 to fit around the rim of the tire. By adjusting the stem 16 tires of various sizes can be mounted on the spider. The spider members, when assembled, are spaced apart so as to allow some space between the tires by means of spacing collars 18 which collars are provided with a keyway 19 so as to slidably fit on key 12. The oven is provided at either side with a side opening 20 closed by glass. In the oven is mounted a semi-circular baffle wall member 21 the object of this baffle wall being to insure more even distribution of the heat throughout the oven. The oven is heated by means of a pair of gas burners 22 and the gases escape through the stack 23. The arrangement however, is such that the gases do not come in direct contact with the tire so as to injure it.

Describing now the manner of rotating the tires while being vulcanized, to the shaft 9 is secured a sprocket 24 which sprocket is driven through means of chain 25 and sprocket 26. The sprocket 26 is mounted on stub shaft 27 carrying a worm gear 28. The worm gear 28 in turn meshes with the worm 29 which in turn is connected to pulley 30. The pulley 30 is driven from the motor 31 through means of belt 32.

The arrangement is such that by constant rotation of the tires in the oven a uniform distribution of heat is obtained so as to insure a very efficient and effective retreading of the tire.

I claim as my invention:

1. In a retreading apparatus, the combination with an oven of a drive shaft extending therethrough, a plurality of spaced spider members adapted to support the tires and slidably mounted on the shaft, means for heating the oven and means for rotating the shaft comprising motor and operative connections between the motor and shaft, 2. In a retreading apparatus, the combination with an oven of a drive shaft extending therethrough, a plurality of spaced spider members adapted to support the tires, means for heating the oven and means for rotating the shaft.

3. In a retreading apparatus, the combination with an oven of a shaft rotatably mounted therein, spiders removably keyed to the shaft, adjustable tire supports carried by the spiders, means for heating the oven and means for rotating the shaft.

WALTER H. HERMSDORF.